United States Patent [19]
Farwell

[11] Patent Number: 5,670,865
[45] Date of Patent: Sep. 23, 1997

[54] CIRCUIT TO IMPROVE THE TRANSIENT RESPONSE OF STEP-DOWN DC TO DC CONVERTERS

[75] Inventor: William D. Farwell, Thousand Oaks, Calif.

[73] Assignee: Hughes Electronics, Los Angeles, Calif.

[21] Appl. No.: 705,439

[22] Filed: Aug. 29, 1996

[51] Int. Cl.$^6$ .................................................. G05F 1/618
[52] U.S. Cl. .................................... 323/285; 323/284
[58] Field of Search .................................. 323/224, 266, 323/282, 284, 285, 286

[56] References Cited

U.S. PATENT DOCUMENTS

| | | | |
|---|---|---|---|
| 4,618,812 | 10/1986 | Kawakami | 323/285 X |
| 4,709,322 | 11/1987 | Mirow | 323/285 X |
| 5,375,029 | 12/1994 | Fukunaga et al. | 323/285 X |

*Primary Examiner*—Peter S. Wong
*Assistant Examiner*—Y. J. Han
*Attorney, Agent, or Firm*—Leonard A. Alkov; Wanda K. Denson-Low

[57] ABSTRACT

A transient response circuit for a step-down DC to DC converter having a DC input and a DC output. The transient response circuit includes a high pass filter (24) for detecting transients at the DC output of the DC to DC converter, a first comparator (31) responsive to the high pass filter for providing a first comparator output that is active when the high pass filter detects a negative transient that is less than a first threshold voltage, a second comparator (32) responsive to the high pass filter for providing a second comparator output that is active when the high pass filter detects a positive transient that is greater than a second threshold voltage, a first switching circuit (41, 43) responsive to the first comparator for providing a current path between the input of the DC to DC converter and the output of the DC to DC converter when the first comparator output is active, and a second switching circuit (42, 45) responsive to the second comparator for providing a current path between the output of the DC to DC converter and a ground reference potential when the second comparator output is active.

6 Claims, 2 Drawing Sheets

5,670,865

CIRCUIT TO IMPROVE THE TRANSIENT RESPONSE OF STEP-DOWN DC TO DC CONVERTERS

BACKGROUND OF THE INVENTION

The disclosed invention is directed to circuitry for improving the transient response of a step-down DC to DC converter.

DC to DC step-down converters are utilized in applications wherein the output of a source DC voltage needs to be converted to a DC supply voltage of a lower or stepped-down voltage level. Typically, the source DC voltage may be converted by some form of switching circuitry wherein the source voltage is chopped into a sequence of on/off periods at a particular switching frequency, and then converted to a lower output DC voltage by an integrating inductor.

Conventional switching converters are limited in transient response by switching frequency and by the impedance and energy storage of the integrating inductor. Good voltage control has been achieved by the use of a very high output capacitance (at very low impedance), or the use of a very high switching frequency that allows the use of a small inductor. Both of these options can be complex and costly.

SUMMARY OF THE INVENTION

It would therefore be an advantage to provide an efficient low cost auxiliary circuit which improves the transient response of a conventional step-down DC to DC converter.

Another advantage would be to provide an auxiliary circuit which improves the transient response of a conventional step-down DC to DC converter and which is usable with any form of DC to DC step-down converter.

A further advantage would be to provide an auxiliary circuit which improves the transient response of a conventional step-down DC to DC converter and whose performance is independent of the particular output voltage of the step-down DC to DC converter.

The foregoing and other advantages are provided by the invention in a transient response circuit for a step-down DC to DC converter having a DC input and a DC output. The transient response circuit includes a high pass filter for detecting transients at the DC output of the DC to DC converter, a first comparator responsive to the high pass filter for providing a first comparator output that is active when the high pass filter detects a negative transient that is less than a first threshold voltage, a second comparator responsive to the high pass filter for providing a second comparator output that is active when the high pass filter detects a positive transient that is greater than a second threshold voltage, a first switching circuit responsive to the first comparator for providing a current path between the input of the DC to DC converter and the output of the DC to DC converter when the first comparator output is active, and a second switching circuit responsive to the second comparator for providing a current path between the output of the DC to DC converter and a ground reference potential when the second comparator output is active.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
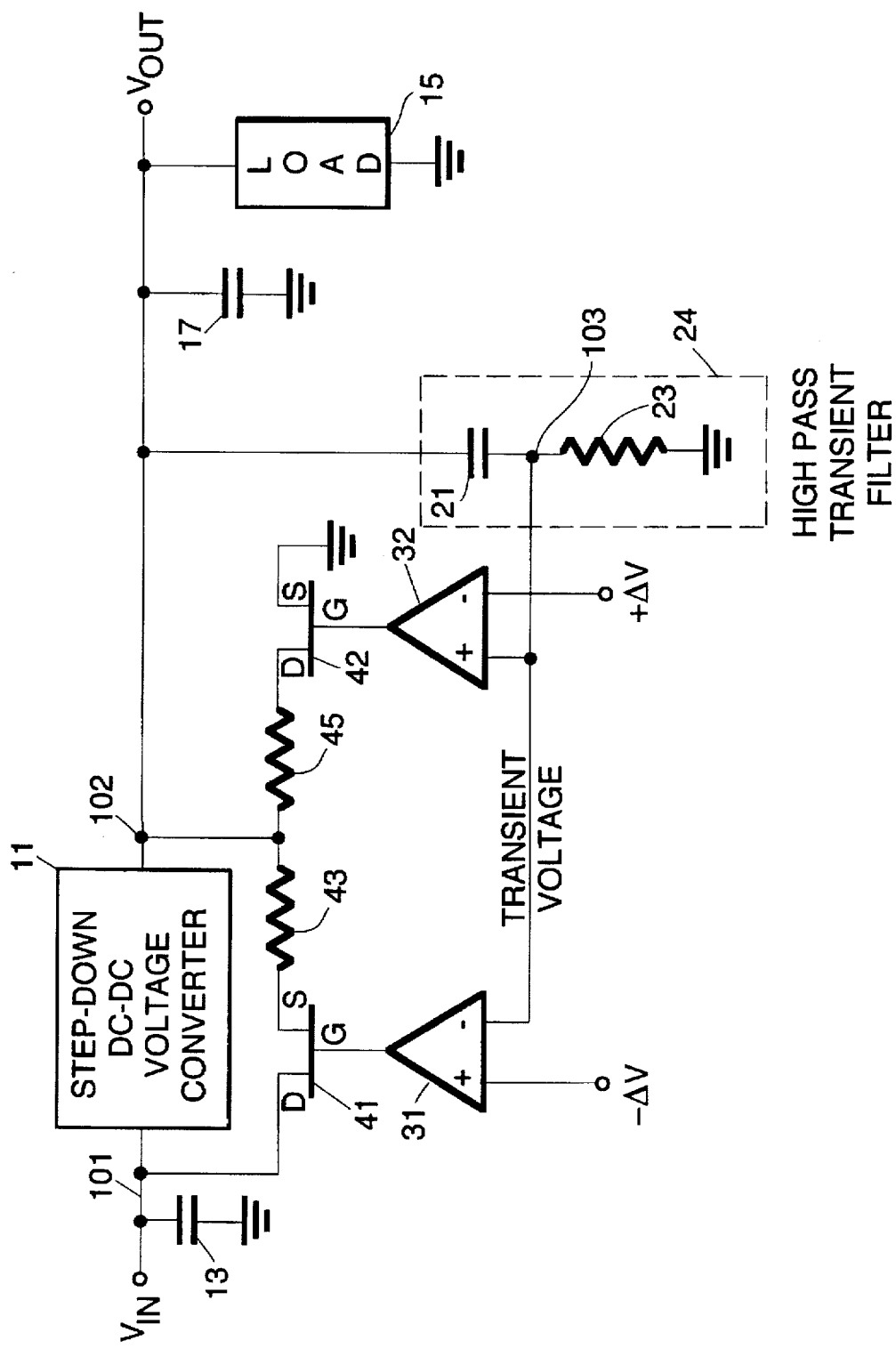
FIG. 1 schematically sets forth a DC to DC step-down conversion system that includes a transient response circuit in accordance with the invention FIG. 2 schematically sets forth a DC to DC step-down conversion system that includes a further implementation of a transient response circuit in accordance with the invention.

In the following detailed description and in the several figures of the drawing, like elements are identified with like reference numerals.

Referring now to FIG. 1, schematically set forth therein is a DC to DC conversion system that includes a transient response circuit in accordance with the invention for controlling the transient response of the DC to DC conversion system. The DC to DC conversion system includes a DC to DC step-down converter 11 (herein called the primary DC to DC converter) that receives a DC input $V_{IN}$ at an input node 101 and provides a stepped-down DC output $V_{OUT}$ at an output node 102. An input capacitor 13 is connected between the input node 101 and a ground reference potential. A load circuit 15 and an output capacitor 17 are connected in parallel between the output node 102 and the ground reference potential.

The transient response circuit includes a capacitor 21 and a resistor 23 connected in series as a high pass filter 24 between the output node 102 and the ground reference potential. The inverting input of a first digital comparator 31 is connected to a node 103 between the capacitor 21 and the resistor 23, while the non-inverting input of the first digital comparator 31 is connected to a first threshold voltage $-\Delta V$. The inverting input of a second digital comparator 32 is connected to a second threshold voltage $+\Delta V$, while the non-inverting input of the second digital comparator 32 is connected to the node 103 between the capacitor 21 and the resistor 23. Thus, the output of the first digital comparator 31 is a logical 1 when the voltage at the node 103 is less than the first threshold voltage $-\Delta V$, and the output of the second digital comparator 32 is a logical 1 when the voltage at the node 103 is greater than the second threshold voltage $+\Delta V$. The output of the first digital comparator 31 is a logical 0 when the voltage at the node 103 is greater than the first threshold voltage $-\Delta V$, and the output of the second digital comparator 32 is a logical 0 when the voltage at the node 103 is less than the second threshold voltage $+\Delta V$.

The output of the first digital comparator 31 is connected to the gate terminal of a first shunt n-channel MOS transistor 41 which is connected in series with a resistor 43 between the input node 101 and the output node 102. In particular, the drain terminal of the first n-channel transistor 41 is connected to the input node 101, while the source terminal of the first n-channel transistor 41 is connected to one terminal of the resistor 43 which has its other terminal connected to the output node 102.

The output of the second digital comparator 32 is connected to the gate terminal of a second shunt n-channel MOS transistor 42 which is connected in series with a resistor 45 between the ground reference potential and the output node 102. In particular, the source terminal of the second n-channel transistor 42 is connected to the ground reference potential, while the drain terminal of the second n-channel transistor 42 is connected to one terminal of the resistor 45 which has its other terminal connected to the output node 102.

When the output of the first comparator 31 is a logical 1, which indicates a negative going transient that is more negative than $-\Delta V$, the first n-channel transistor 41 is turned on such that the DC to DC converter is shunted by the n-channel transistor 41 and the resistor 43, which provides an alternate path for supplying additional load current. The resistance $R_{43}$ of the resistor 43 is selected in view of the on resistance of the first n-channel transistor 41 such that the shunt path will provide maximum load current $I_{LMAX}$. In particular, $R_{43}$ is selected as follows:

$$R_{43}=(V_{IN}-V_{NOM})/I_{LMAX}-R_{41on}$$

where $V_{NOM}$ is the nominal output of the DC to DC converter 11 and $R_{41on}$ is the on resistance of the n-channel transistor 41. In this manner, if the load current suddenly changes from zero to maximum, the shunt will source current from the supply voltage $V_{IN}$ until the DC to DC converter circuit can respond.

When the output of the second comparator 32 is a logical 1, which indicates a positive going transient that is more positive than $+\Delta V$, the second n-channel transistor 42 is turned on such that the load circuit 15 is shunted by the second n-channel transistor 42 and the resistor 45, which provides a path for dumping excessive current. The resistance $R_{45}$ of the resistor 45 is selected in view of the on resistance of the second n-channel transistor 42 such that the shunt path will provide maximum load current $I_{LMAX}$. In particular, $R_{45}$ is selected as follows:

$$R_{45}=V_{NOM}/I_{LMAX}-R_{42on}$$

where $V_{NOM}$ is the nominal output of the DC to DC converter 11 and $R_{42on}$ is the on resistance of the n-channel transistor 42.

It is noted that the resistors 43, 45 provide maximum current limiting to protect for cases of an output short circuit. In normal operation, current limiting is dynamic and adjusts to a value that is just sufficient to compensate for a load current deficit or surplus.

In the case of a current deficit (due to the primary DC to DC converter 11 not responding fast enough to an increased load current demand), as the negative transient voltage drops below $-\Delta V$, the first n-channel transistor 41 turns on. The auxiliary source current increases until the negative transient voltage is just above $-\Delta V$, at which time the first n-channel transistor 41 turns off. The negative transient voltage again drops below $-\Delta V$, and the first n-channel transistor 41 again turns on. This process continues, maintaining the negative transient voltage in the region of $-\Delta V \pm \sigma$, where the error $\sigma$ is determined by conventional feedback design principles, until the primary DC to DC converter 11 finally regains regulation and holds the negative transient voltage to be greater than $-\Delta V$.

In the case of a current surplus (due to the primary DC to DC converter 11 not responding fast enough to a decreased load current demand), as the positive transient voltage exceeds $+\Delta V$, the second n-channel transistor 42 turns on. The auxiliary sink current increases until the positive transient voltage is just below $+\Delta V$, at which time the second n-channel transistor 42 turns off. The positive transient voltage again exceeds $+\Delta V$, and the second n-channel transistor 42 again turns on. This process continues, maintaining the positive transient voltage in the region of $+\Delta V \pm \sigma$, where the error $\sigma$ is determined by conventional feedback design principles, until the primary DC to DC converter 11 finally regains regulation and holds the positive transient voltage to be less than $+\Delta V$.

Thus, the first comparator 31 controls the first shunt n-channel transistor 41 which is connected between $V_{OUT}$ and $V_{IN}$ and is turned on to compensate negative transients. The second comparator 32 controls the second shunt n-channel transistor 42 which is connected between $V_{OUT}$ and ground and is turned on to compensate positive transients. While the disclosed implementation of the invention employs N-channel transistors, persons skilled in the art will recognize that the invention can be implemented with any transistor type.

The high pass filter 24 comprised of the capacitor 21 and the resistor 23 detects the presence and magnitude of transients in the output voltage $V_{OUT}$. Transients are rapidly occurring changes in the output voltage caused by changes in the load current (dI/dt) which occur more rapidly than the DC to DC converter 11 can respond. More particularly, the primary DC to DC converter 11 cannot instantaneously change its output current in response to load changes, due to the reactance of its integrating inductor. Thus, a transient voltage error occurs as the load current changes, and the magnitude of the transient voltage error is proportional to L(dI/dt) where L is the inductance of the integrating inductor of the primary DC to DC converter 11.

The high pass filter 24 comprised of the capacitor 21 and the resistor 23 is a conventional single pole RC network (although other high pass filters can be used). If the transition time (i.e., rise time) of a transient voltage step is less than the time constant $\tau$ of the RC high pass filter 24, then the amplitude of the transient appears on the node 103 and subsequently decays back to zero at the discharge rate of the RC high pass filter 24. The time constant $\tau$ of the high pass filter 24 is equal to R*C, where R is the resistance of the resistor 23 and C is the capacitance of the capacitor 21, and is selected to be as long or longer than the time required by the primary DC to DC converter 11 to respond. If the rate of change of the output substantially less than the time constant $\tau$ of the RC high pass filter 24 (such that the primary DC to DC converter 11 is able to respond), then no voltage is passed to the node 103 and the transient response circuit remains quiescent.

Effectively, the high pass filter 24 detects transients that have a transition time or rise time that is less than the time constant $\tau$ of the RC high pass filter 24. If these transients are of sufficient magnitude, then the transient response circuit is activated.

An advantage of detecting transients via a high pass filter 24 is that the operation of the transient response circuit is independent of the DC level of the output voltage $V_{OUT}$. It can be used with any DC output level without special adjustment. Further, since the transient response circuit does not respond to less rapid output voltage changes, it can be used with a DC to DC converter having a variable output voltage, with no special adjustment.

Figure 2:
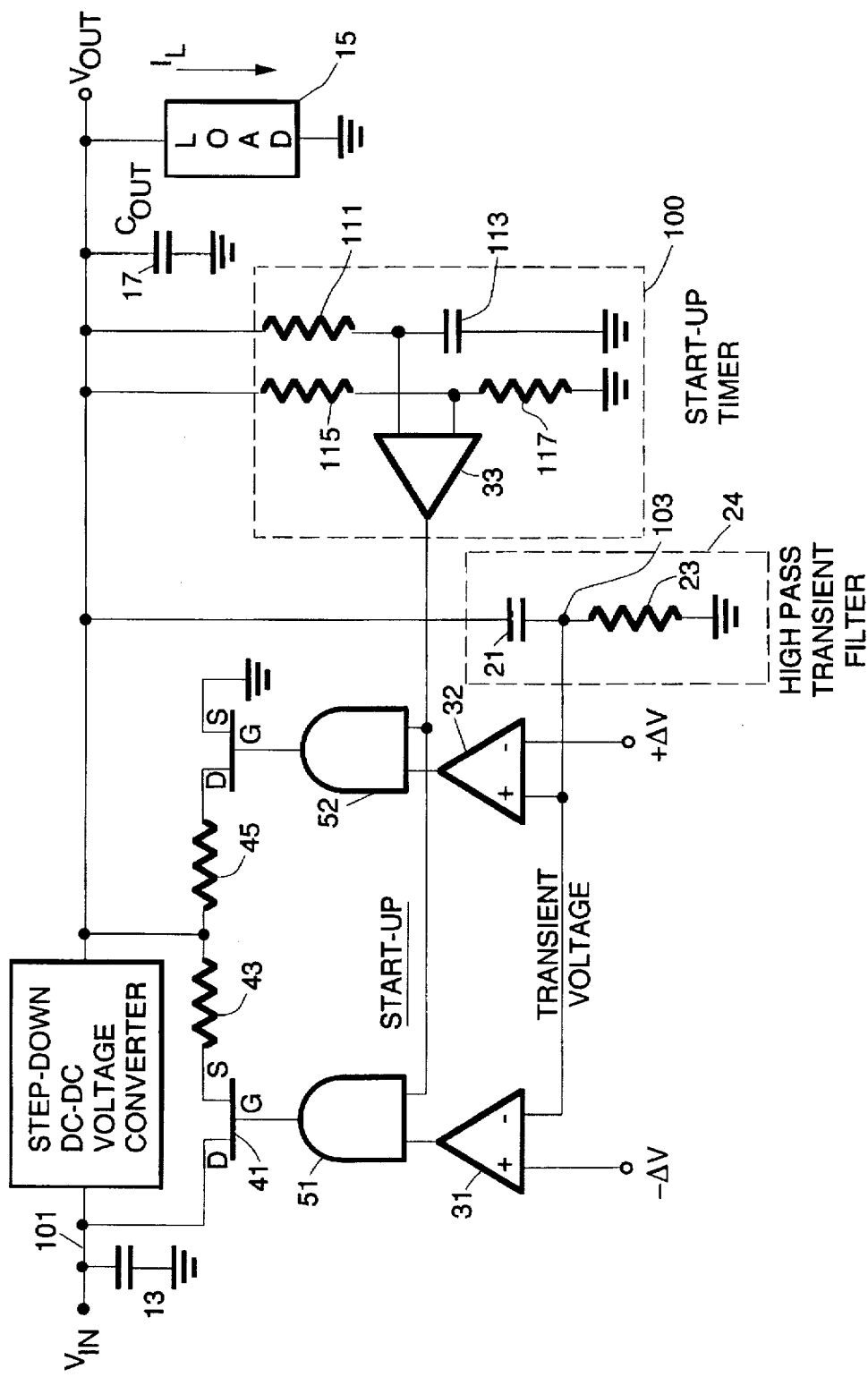

Referring now to FIG. 2, schematically set forth therein is a DC to DC step-down conversion system that includes a further implementation of a transient response circuit in accordance with the invention. The DC to DC step-down conversion system of FIG. 2 is substantially similar to the DC to DC step-down conversion system of FIG. 1, except for the addition of a start-up timer 100 and AND gates 51, 52.

In particular, the start-up timer 100 includes a resistor 111 and a capacitor 113 connected in series between the output node and ground, and resistors 115, 117 connected in series between the output node and ground. The mode between the resistor 111 and the capacitor 113 is connected to the non-inverting input of a third digital comparator 33 whose inverting input is connected to the node between the resistors 115, 117. The output of the third digital comparator 33 comprises a $\overline{\text{STARTUP}}$ signal which is a logical 1 when circuit startup is sensed.

The output of the first digital comparator 31 is provided as one input to an AND gate 51 whose output is provided to the gate of the first n-channel MOS transistor 41. The $\overline{\text{STARTUP}}$ signal output of the third comparator 33 is provided as another input to the AND gate 51. The output of the second digitaone inputtor 31 is provided as one input to an AND gate 53 whose output is provided to the gate of the second n-channel MOS transistor 41. The $\overline{\text{STARTUP}}$ signal output of the third comparator 33 is provided as another input to the AND gate 51. Thus, when the $\overline{\text{STARTUP}}$ signal is a logical 1, the outputs of the first and second comparators 31, 32 are disengaged from the first and transistors 41, 42, whereby the transient response circuitry is disabled.

The time constant $\tau_T$ of the serially connected resistor 111 and capacitor 113 is equal to $R_T * C_T$, where $R_T$ is the resistance of the resistor 111 and $C_T$ is the capacitance of the capacitor 113, and is selected such that the output of the third comparator 33 goes high only after the output of the primary DC to DC converter achieves its steady value subsequent to being switched on. Since start-up is inherently a transient condition (the output $V_{OUT}$ is changing from zero to its specified value), it may be desirable to disable the transient response circuit so that it does not counteract the primary DC to DC converter by shunting current to ground while the DC to DC converter is trying to increase the output voltage $V_{OUT}$. The time constant $\tau_T$ of the serially connected resistor 111 and capacitor 113 is typically much greater than the time constant $\tau$ of the high pass filter 24 comprised of the serially connected resistor 23 and capacitor 21, and the start-up timer 100 has no effect during normal operation.

The foregoing has thus been a disclosure of a DC to DC step-down converter transient response circuit that advantageously operates independently of the steady state output voltage, is unaffected by drift, has no long term effect in the event of a shift in output voltage, whether directed or due to failure, and is adaptive to new operating conditions. Further, the disclosed transient response circuit augments converter operation only during transient voltage events due to rapid changes in load current demand, and thus its duty cycle is low and its effect on efficiency is small.

Although the foregoing has been a description and illustration of specific embodiments of the invention, various modifications and changes thereto can be made by persons skilled in the art without departing from the scope and spirit of the invention as defined by the following claims.

What is claimed is:

1. A transient response circuit for a step-down DC to DC converter having a DC input and a DC output, the transient response circuit comprising:

means for detecting transients at the DC output of the DC to DC converter;

first comparator means responsive to said detecting means for providing a first comparator means output that is active when said detecting means detects a negative transient that is less than a first threshold voltage;

second comparator means responsive to said detecting means for providing a second comparator means output that is active when said detecting means detects a positive transient that is greater than a second threshold voltage;

first switching means responsive to said first comparator means for providing a current path between the input of the DC to DC converter and the output of the DC to DC converter when said first comparator means output is active; and second switching means responsive to said second comparator means for providing a current path between the output of the DC to DC converter and a ground reference potential when said second comparator means output is active.

2. The transient response circuit of claim 1 wherein:

said means for detecting transients comprises a high pass filter including a capacitor and a resistor connected in series;

said first comparator means comprises a first comparator circuit having an inverting input connected to a node between said capacitor and said resistor, and a non-inverting input connected to said first threshold voltage; and said second comparator means comprises a second comparator circuit having a non-inverting input connected to said node between said capacitor and said resistor, and an inverting input connected to said second threshold voltage.

3. The transient response circuit of claim 1 wherein said first switching means includes an MOS transistor, and wherein said second switching means includes an MOS transistor.

4. The transient response circuit of claim 1 wherein said first threshold voltage and said second threshold voltage are of opposite polarities.

5. The transient response circuit of claim 1 further including:

a start-up timer circuit for detecting start-up of the DC to DC step-down converter and providing a start-up signal that is active during start-up of the DC to DC step-down converter;

first gating means responsive to said start-up timer for disengaging said first comparator means from said first switching means while said start-up signal is active; and second gating means responsive to said start-up timer for disengaging said second comparator means from second switching means while said start-up signal is active.

6. The transient response circuit of claim 5 wherein said start-up timer comprises:

first and second resistors connected in series between the DC output of the step-down DC to DC converter and a reference potential;

a third resistor and a capacitor connected in series between the DC output of the step-down DC to DC converter and a reference potential; and a comparator having an inverting input connected to the node between the first and second resistors, and a non-inverting input connected to the node between said third resistor and said capacitor.

* * * * *